April 19, 1938.  G. C. HARBISON  2,114,878
FOOD STORAGE RECEPTACLE FOR REFRIGERATORS
Filed Feb. 3, 1937
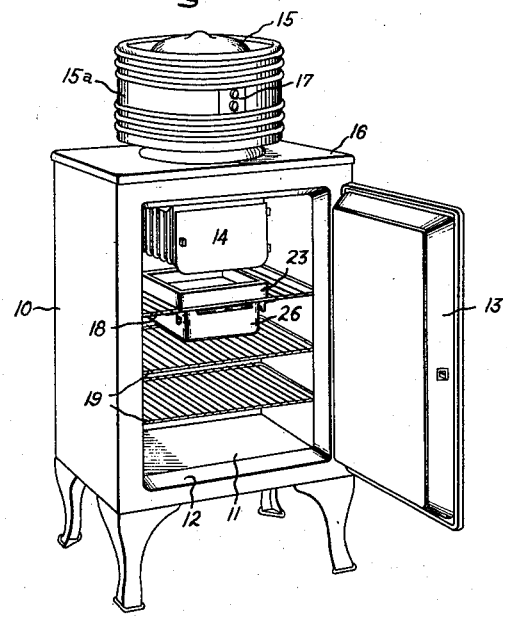
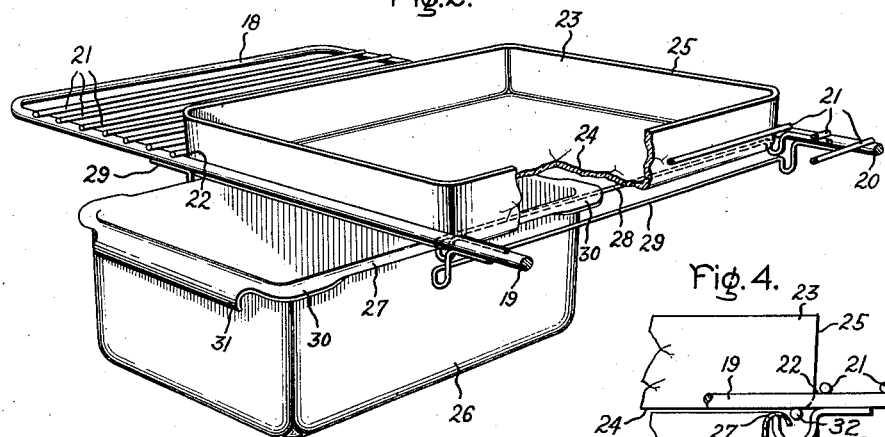
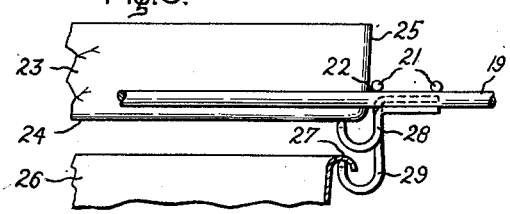
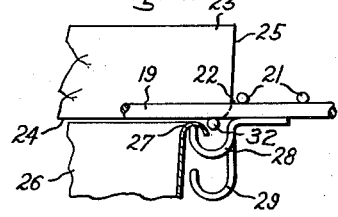
Inventor:
George C. Harbison,
by Harry E. Dunham
His Attorney Patented Apr. 19, 1938

2,114,878

UNITED STATES PATENT OFFICE 2,114,878

FOOD STORAGE RECEPTACLE FOR REFRIGERATORS

George C. Harbison, Erie, Pa., assignor to General Electric Company, a corporation of New York Application February 3, 1937, Serial No. 123,749

7 Claims. (Cl. 62—89)

My invention relates to refrigerators, and more particularly to food storage receptacles associated with the refrigerated compartments of refrigerators for preserving fruits, green vegetables, meats, and the like.

The refrigerated compartment of a household refrigerator is usually maintained at an average temperature between 40° F. and 45° F. for general refrigeration purposes. An average temperature within this range may be maintained in the refrigerated compartment by the convection currents of air set up therein by a refrigerant evaporator located in the upper portion of the refrigerated compartment. In the usual refrigerator this result is obtained by maintaining the temperature of the surface of the evaporator considerably below 32° F., for example, approximately 20° F. During the operation of the refrigerator the evaporator removes a considerable amount of the moisture in the air circulated in the refrigerated compartment, which appears upon the surface of the evaporator in the form of frost, resulting in the maintenance of an atmosphere in the refrigerated compartment having a low relative humidity, often as low as 40 per cent. While a storage atmosphere having a temperature within the range mentioned and a relative humidity as low as 40 per cent is satisfactory for the preservation of some foods, certain types of foods such, for example, as green vegetables and meats may be more satisfactorily preserved in a storage atmosphere having a lower temperature and a higher relative humidity. For example, I have found a storage atmosphere having a temperature of approximately 36° F. and a relative humidity of approximately 95 per cent to be ideal for the preservation of green vegetables, and a storage atmosphere having a temperature of approximately 36° F. and a relative humidity of approximately 85 per cent to be ideal for the preservation of meats. When green vegetables are stored in an atmosphere having the preservation conditions above set forth, they retain their crispness and remain in an unwilted condition for a considerable period of time. Likewise, when fresh meats are stored in an atmosphere having the preservation conditions above set forth, they retain substantially their original moisture content and remain in a good condition for a considerable period of time.

An object of my invention is to provide an improved construction and arrangement of a food storage receptacle in the refrigerated compartment of a refrigerator, whereby substantially the temperature and relative humidity set forth above are obtained.

A further object of my invention is to provide a food storage receptacle for the refrigerated compartment of a refrigerator having an improved arrangement for varying the preservation conditions of the air in the receptacle to accommodate the storage of different types of foods.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a perspective view of a refrigerator provided with a food storage receptacle embodying my invention; Fig. 2 is an enlarged fragmentary perspective view of the food storage receptacle and associated parts shown in Fig. 1; Fig. 3 is a fragmentary end elevation of the construction shown in Fig. 2; and Fig. 4 is a fragmentary end elevation of a modified form of the construction shown in Figs. 2 and 3.

Referring to the drawing, in Fig. 1 I have shown a household refrigerator 10 provided with a heat insulated refrigerated compartment 11 having an opening 12 in the front wall thereof and a heat insulated door 13 for the opening 12. The cabinet is cooled by a refrigerating machine including a refrigerant evaporator 14 arranged in the upper portion of the compartment 11 and connected to a motor driven compressor enclosed in a casing 15 and an air cooled condenser 15a. The refrigerating machine constitutes a unitary construction supported upon a removable top wall 16 of the refrigerator to facilitate assembly of the refrigerator. A suitable thermal control arrangement includes a temperature adjusting device 17 mounted on the condenser 15a and is associated with the refrigerating machine in order that any given average temperature over a predetermined range of temperatures can be maintained in the refrigerated compartment 11. A shelf 18 is supported on the side walls of the refrigerated compartment 11 below the evaporator 14, and a series of vertically spaced apart shelves 19 are supported on the side walls of the refrigerated compartment 11 below the shelf 18. The shelves 18 and 19 are preferably made of wire so as not to interfere with the circulating currents of air in the refrigerated compartment 11 set up by the evaporator 14.

The shelf 18 comprises a border frame having front and rear transverse bars 19 and 20, respectively, and spaced apart groups of longitudinal bars 21, the groups of longitudinal bars being arranged on each end of the shelf 18 to provide an opening 22 in the body of the shelf. The longitudinal bars 21 are closely spaced apart and secured to the front and rear transverse bars 19 and 20 to provide an article supporting surface on the shelf on each side of the opening 22 therein. The shelf 18 is so constructed that the opening 22 therein is in vertical alignment with the evaporator 14.

A drip tray 23 having a substantially flat bottom 24 and an upstanding rim 25 thereabout is removably supported in the opening 22 in the shelf 18 and immediately below the evaporator 14 to receive any moisture dripping from the evaporator, the flat bottom of the drip tray 23 being arranged below the upper surface of the shelf 18. A food storage receptacle 26 having an open top and a flanged rim 27 thereabout is slidably supported below the drip tray 23, as shown in Figs. 2 and 3. An arrangement including an upper set of spaced apart rods 28 and a lower set of spaced apart rods 29 on each side of the receptacle is carried by the shelf 18 for supporting the drip tray 23 and the food storage receptacle 26, the spacing between the upper and lower sets of rods being only a relatively small distance. The rods 28 and 29 extend between the transverse bars 19 and 20 and have substantially U-shaped ends rigidly secured to the transverse bars 19 and 20 by soldering, welding or the like. The portions of the rods 28 and 29 extending between the bars 19 and 20 project into the space below the opening 22 in the shelf 18 and are adapted to slidably engage and support the sides of the rim 27 of the food storage receptacle 26. The rods 28 and 29 constitute projections carried by the shelf for supporting the drip tray and the receptacle. The drip tray 23 is removably supported in the opening 22 in the shelf 18 upon its flat bottom 24 by the upper set of spaced apart rods 28 and is retained in place on the shelf by the transverse bars 19 and 20 and the groups of longitudinal bars 21 disposed on each side of the opening 22.

When the food storage receptacle, shown in Figs. 2 and 3, is arranged in the refrigerated compartment 11, the same may be slidably supported below the shelf 18 and closely adjacent the drip tray 23 upon the upper set of spaced apart rods 28. In this position the rim 27 is slidably supported on the rods 28 and slidably engages the bottom of the drip tray. The receptacle 26 also may be slidably supported in another position below the shelf 18 and in spaced relation to the drip tray 23 upon the lower set of spaced apart rods 29. In either of these positions the drip tray serves as a cover for the receptacle. The food storage receptacle 26 may be slid to an extended position to afford access to the food contained therein or, if desired, it may be completely removed from the refrigerated compartment 11 through the door opening 12. The corners of the rim 27 of the food storage receptacle 26 disposed between the ends and the sides of the rim are flattened as indicated at 30 in order to facilitate sliding of the rim 27 upon the sets of spaced apart rods 28 and 29, while the sides of the rim disposed intermediate the corners 30 are curved slightly downwardly to form guideways in the rim to receive the sets of spaced apart rods 28 and 29. In order to facilitate sliding of the food storage receptacle 26 a downward extension 31 is provided on one end of the rim 27 to constitute a handle.

The arrangement of the food storage receptacle shown in Fig. 4 is similar to that of Figs. 2 and 3, except that the drip tray 23 is supported upon a pair of spaced apart rods 32 extending between the transverse bars 19 and 20 of the shelf 18, instead of being supported upon the upper set of spaced apart rods 28. The rods 32 are secured to the lower surfaces of the bars 19 and 20, thus providing a small space between the flat bottom 24 of the drip tray 23 and the rim 27 of the food storage receptacle 26 when the latter is supported upon the upper set of spaced apart rods 28 and closely adjacent the drip tray 23. This arrangement renders sliding of the food storage receptacle 26 somewhat easier as the rim 27 thereof is relieved of the weight of the drip tray 23, yet the amount of air circulation between the interior of the refrigerated compartment 11 and the interior of the food storage receptacle 26 is substantially the same as in the arrangement shown in Figs. 2 and 3.

Due to the arrangement of the drip tray 23 directly below the evaporator 14, it is contacted by cold air falling from the evaporator which produces a temperature slightly below 32° F. in the drip tray. This permits the drip tray 23 to be utilized for the storage of frozen articles during the normal operation of the refrigerating machine, as well as a drip tray for the evaporator 14 during defrosting of the refrigerating machine. The position of the food storage receptacle 26 slightly below the drip tray 23 is effective to produce a temperature of the air in the food storage receptacle somewhat below the average temperature of the air circulated in the refrigerated compartment 11. The temperature of the air in the food storage receptacle 26 can be readily maintained at approximately 36° F. when the receptacle is in either its upper or lower position, although the average temperature of the air circulated in the refrigerated compartment 11 is maintained at a temperature of only approximately 40° F. The drip tray 23 serves as a cover for the food storage receptacle 26, permitting only a slight amount of air circulation between the interior of the refrigerated compartment 11 and the interior of the food storage receptacle when the latter is supported upon the upper set of spaced apart rods 28, and permitting an increased amount of air circulation between the interior of the refrigerated compartment 11 and the interior of the food storage receptacle when the latter is supported upon the lower set of spaced apart rods 29. With this arrangement the relative humidity of the air in the food storage receptacle 26 may be readily maintained at approximately 95 per cent when the food storage receptacle is supported upon the upper set of spaced apart rods 28, and the relative humidity of the air in the food storage receptacle 26 may be readily maintained at approximately 85 per cent when the food storage receptacle is supported upon the lower set of spaced apart rods 29. Thus, green vegetables may be stored under ideal preservation conditions when the food storage receptacle 26 is supported upon the upper set of spaced apart rods 28, and meats may be stored under ideal preservation conditions when the food storage receptacle is supported upon the lower set of spaced apart rods 29.

While I have shown a particular embodiment of my invention in connection with a household refrigerator, I do not desire my invention to be limited to the particular construction shown and described, and I intend in the appended claims to cover all modifications within the spirit and scope of my invention.

What I claim as new and desire to secure by Letters Patent of the United States, is:—

1. In combination with a refrigerator having a refrigerated compartment, a tray and a food storage receptacle in said compartment, a shelf in said compartment having an opening therein adapted to receive said tray, and means for supporting said tray in the opening in said shelf and for supporting said receptacle below and closely adjacent the bottom of said tray, the bottom of said tray serving as a cover for said receptacle.

2. In combination with a refrigerator having a refrigerated compartment, a tray and a food storage receptacle in said compartment, said receptacle having an open top and a rim thereabout, a shelf in said compartment, and means including spaced apart rods carried by said shelf and engaging the rim of said receptacle for slidably supporting said receptacle, said tray being supported upon the rim of said receptacle to serve as a cover therefor.

3. In combination with a refrigerator having a refrigerated compartment, a tray and a food storage receptacle in said compartment, said receptacle having an open top and a rim thereabout, a shelf in said compartment having an opening therein adapted to receive said tray, and means carried by said shelf and engaging the rim of said receptacle for supporting said receptacle below the opening in said shelf, said tray being supported in the opening in said shelf upon the rim of said receptacle to serve as a cover therefor.

4. In combination with a refrigerator having a refrigerated compartment, a tray and a food storage receptacle in said compartment, a shelf in said compartment having an opening therein adapted to receive said tray, means including an upper set of spaced apart projections carried by said shelf for supporting said tray in the opening in said shelf, and means including a lower set of spaced apart projections carried by said shelf for supporting said receptacle below said tray in spaced relation thereto, the bottom of said tray being arranged below the upper surface of said shelf and serving as a cover for said receptacle.

5. In combination with a refrigerator having a refrigerated compartment, a tray and a food storage receptacle in said compartment, a shelf in said compartment having an opening therein adapted to receive said tray, said tray being supported in the opening in said shelf, and means for supporting said receptacle below and in engagement with the bottom of said tray and for supporting said receptacle below and in spaced relation to the bottom of said tray.

6. In combination with a refrigerator having a refrigerated compartment, a tray and a food storage receptacle in said compartment, a shelf in said compartment having an opening therein and adapted to receive said tray, said tray being supported in the opening in said shelf, means including an upper set of spaced apart projections carried by said shelf for supporting said receptacle below and in engagement with the bottom of said tray, and means including a lower set of spaced apart projections carried by said shelf for supporting said receptacle below and in spaced relation to the bottom of said tray.

7. In combination with a refrigerator having a refrigerated compartment, a refrigerant evaporator in said compartment, a shelf in said compartment below said evaporator, said shelf having an opening therein arranged in vertical alignment with said evaporator, a drip tray and a food storage receptacle in said compartment, said drip tray being supported in the opening in said shelf to receive any moisture dripping from said evaporator, and means for supporting said receptacle below and in engagement with the bottom of said drip tray and for supporting said receptacle below and in spaced relation to the bottom of said drip tray.

GEORGE C. HARBISON.